Patented Oct. 23, 1934

1,978,228

UNITED STATES PATENT OFFICE 1,978,228

PROCESS OF MAKING TITANIUM DIOXIDE

Byramji D. Saklatwalla and Holbert Earl Dunn, Crafton, Pa., and Albert E. Marshall, Scarsdale, N. Y., assignors to Southern Mineral Products Corporation, New York, N. Y., a corporation of Delaware No Drawing. Application August 8, 1932, Serial No. 627,933

8 Claims. (Cl. 23—202)

The present invention relates to a process of making titanium dioxide, and more especially to the hydrolytic precipitation of basic titanic sulphate which is converted by calcination into titanium dioxide.

In the usual sulphuric acid process of making titanium dioxide from titaniferous ores, such as ilmenite, the ore is ground and mixed with strong sulphuric acid, the mixture is heated, and reaction occurs in which the titanium and iron contents of the ore are converted into titanium and iron sulphates. The sulphated ore is then leached with water to extract the soluble titanium and iron sulphates, forming what is known as a strong liquor. The strong liquor also contains other metallic impurities which have been rendered soluble by the sulphuric acid, such as compounds of vanadium, chromium, nickel, copper, manganese, and compounds of various other metals which may be present in the ore. This solution is then generally treated with metallic iron to convert ferric sulphate into ferrous sulphate. Sometimes a part of the ferrous sulphate is then removed by crystallization. The strong liquor containing the titanium sulphate, together with some ferrous sulphate and various soluble metallic impurities, is then usually diluted and heated so as to hydrolyze the titanium sulphate and produce the precipitate which is variously referred to as basic titanic sulphate, hydrated titanic sulphate, meta-titanic acid, hydrated titanic acid, titanium dioxide, etc. This precipitate is a complex mixture which may contain varying proportions of titanic acid and basic titanium sulphates. The precipitate is then dried, calcined, ground, and used for various purposes, such as for pigments.

The pigments prepared from the precipitate thus obtained have not been a pure white color, particularly where the hydrolyzed solution contained appreciable amounts of metallic impurities. Also, the particle size of the calcined precipitate has been such as not to give the best tinting strength without very careful and extensive milling and grinding.

We have found that when hydrolysis is carried out in the usual way as above described, the hydrolysis tends to start at a very rapid rate and then the rate of hydrolysis gradually decreases. The result is that a material proportion of the basic titanic sulphate is formed almost immediately upon the initiation of the hydrolysis. Our investigations have shown that this initially rapidly precipitated basic titanic sulphate is contaminated with more metallic impurities than the major portion of the sulphate which is precipitated at a slower and more normal rate. Moreover, the initially rapidly precipitated basic titanic sulphate appears to have a somewhat larger particle size. This initially rapidly precipitated titanic sulphate, which may amount to 20 to 30% of the total, contaminates the purer and finer basic titanic sulphate which is later precipitated at a slower rate, so that the resultant product is not pure white and does not have maximum tinting strength.

We have found that this first more rapidly precipitated fraction may be produced substantially uncontaminated with metallic impurities and of finer particle size, by retarding its rate of formation, and that this can be accomplished by the presence of an excess of free sulphuric acid in the dilute solution when it is initially subjected to hydrolysis.

The preferred procedure in carrying out our improved process is as follows:—The titaniferous ore, such as ilmenite, is ground, mixed with strong sulphuric acid, and heated in the usual manner to convert the titanium and iron contents of the ore into titanium and iron sulphates. The sulphated ore is then leached with water to extract soluble titanium and iron sulphates. This solution of strong liquor also contains other metallic impurities present in the ore. The amount of leaching water used is such as to produce a strong liquor containing about 6 to 8% of titanium dioxide content. The liquor is treated with metallic iron to convert ferric sulphate into ferrous sulphate. If a considerable proportion of iron is dissolved in the strong liquor, some of it may be removed by crystallizing out part of the ferrous sulphate.

Enough sulphuric acid is added to the strong liquor to bring up the free sulphuric acid content to about 10%. The acidulated strong liquor is then preferably heated to about 180 to 190° F. The acidulated strong liquor is then diluted with acidulated water at about 200 to 205° F. and containing about 10% free sulphuric acid. Upon dilution, enough acidulated water is added to produce a dilute solution containing preferably about 2 to 4% titanium dioxide content.

The hot dilute solution is then further heated so as to effect the hydrolytic precipitation of the titanium sulphate as basic titanic sulphate. Because of the presence of the excess free acid, the hydrolysis is found to proceed at a much more uniform rate, and the rapid initial precipitation of a precipitate contaminated with metallic impurities and of an undesirable particle size, which would occur if the excess free acid were not present, is avoided.

The heating of the dilute solution is continued until the desired degree of precipitation of basic titanic sulphate is obtained. The heating is then discontinued and the precipitate is removed by filtration. The filtrate is washed to remove any traces of soluble metallic impurities. We have found that the soluble metallic impurities are much more readily washed from the precipitate as thus produced than is the case of a precipitate produced in the usual way without the initial excess of free sulphuric acid.

The washed precipitate is then dried and calcined. The calcined material is substantially pure titanium dioxide, substantially pure white in color and of a fine particle size to produce a pigment having high tinting strength.

While we prefer to employ about 10% of free acid in the solution to be hydrolyzed, the acid content may vary from 8 to 12%, or even from 6 to 14%, and still substantially repress the undesirable very rapid initial formation of the contaminated basic titanic sulphate obtained when no free acid is employed or smaller amounts of free acid are employed. We have found that to obtain the advantages of our invention a certain minimum of free acid must be employed which is, in general, somewhat in excess of 6%. The amount of free acid necessary is dependent to some extent upon the amount of metallic impurities, such as iron. If the metallic impurities be relatively low, the acid strength may be correspondingly reduced. However, as one of the advantages of our process is the use of solutions contaminated by iron and other impurities, we prefer to use such solutions as obtained by leaching the sulphatized ore, using a sufficient amount of free acid to prevent contamination of the product. In this way we can obtain a relatively pure product and at the same time avoid pretreatment of the solution for the removal of the metallic impurities which would darken the color of the titanium dioxide unless their precipitation was suppressed by the use of the free acid.

The titanium dioxide content of the dilute solution to be hydrolyzed is kept as high as possible consistent with obtaining a basic titanic sulphate precipitate of the desired degree of whiteness. If the impurities are present in relatively small amounts, a titanium dioxide content of up to 4% or possibly up to 5% may be employed. If a considerable amount of metallic impurities is present, the solution should be diluted until the titanium dioxide content is about 2%. It may be diluted even below this, although for reasons of economy in handling the solution it should not be diluted below about 1 or 2% of titanium dioxide content.

When the strong liquor and the water are preheated before mixing, it is preferable to acidulate the strong liquor as well as the water before heating and mixing, because of the tendency of the hydrolysis to begin immediately upon the mixing of the hot water with the hot strong liquor. When the diluting water and strong liquor are mixed cold, it is still preferable to acidulate the water before mixing it with strong liquor, although this is not necessary in all cases and the acid can be added either before or after the mixing of the strong liquor and diluting water, the important thing being to have a sufficient excess of free acid present at the time hydrolysis commences, so as to prevent a too rapid initiation of the hydrolytic precipitation of the basic titanic sulphate. Instead of adding acid to bring up the solution which is hydrolyzed to the proper acid concentration, the excess acid may be supplied by using a sufficient excess of acid in the initial strong sulphuric acid attack upon the ore. This initial excess of acid will continue in the strong liquor which is leached from the ore and may supply a part or even all of the excess acid required in the solution to be hydrolyzed.

While we have specifically described the preferred embodiment of our process, it is to be understood that the process may be otherwise embodied and practiced within the scope of the following claims.

We claim:

1. In the process of making titanium dioxide, the step which comprises heating a dilute water solution containing titanium sulphate and from about 6 to 14% free sulphuric acid to cause precipitation of basic titanic sulphate.

2. In the process of making titanium dioxide, the step which comprises heating a dilute water solution containing titanium sulphate and about 8 to 12% free sulphuric acid to cause precipitation of basic titanic sulphate.

3. In the process of making titanium dioxide, the step which comprises heating a dilute water solution containing titanium sulphate having a titanium dioxide content of about 1 to 5% and containing about 8 to 12% free sulphuric acid to cause precipitation of basic titanic sulphate.

4. In the process of making titanium dioxide, the step which comprises heating a dilute solution containing titanium sulphate having a content of titanium dioxide of about 2 to 4% and containing about 10% free sulphuric acid to cause precipitation of basic titanic sulphate.

5. In the process of making titanium dioxide, those steps which comprise heating a strong liquor containing titanium sulphate and from 6 to 14% free sulphuric acid, heating a water solution containing from 6 to 14% free sulphuric acid, mixing the said heated solutions, and further heating the mixture, whereby the hydrolytic precipitation of basic titanic sulphate is effected.

6. In the process of making titanium dioxide, those steps which comprise heating a strong liquor containing titanium sulphate and from 8 to 12% free sulphuric acid, heating a water solution containing from 8 to 12% free sulphuric acid, mixing the said heated solutions, and further heating the mixture, whereby the hydrolytic precipitation of basic titanic sulphate is effected.

7. In the process of making titanium dioxide, those steps which comprise heating to about 180 to 190° F. a strong liquor containing titanium sulphate and from 6 to 14% free sulphuric acid, heating to about 200 to 205° F. a water solution containing from 6 to 14% free sulphuric acid, mixing the said heated solutions, and further heating the mixture, whereby the hydrolytic precipitation of basic titanic sulphate is effected.

8. In the process of making titanium dioxide, those steps which comprise heating a dilute water solution containing titanium sulphate and about 8 to 12% free sulphuric acid to cause precipitation of basic titanic sulphate, removing and drying the precipitate, and calcining the precipitate whereby titanium dioxide substantially pure white in color and of a fine particle size is produced.

BYRAMJI D. SAKLATWALLA.
HOLBERT EARL DUNN.
ALBERT E. MARSHALL.